May 14, 1957 R. NEUSCHOTZ 2,791,787
METHOD OF FORMING TUBULAR LOCKING INSERTS
Filed Oct. 19, 1953
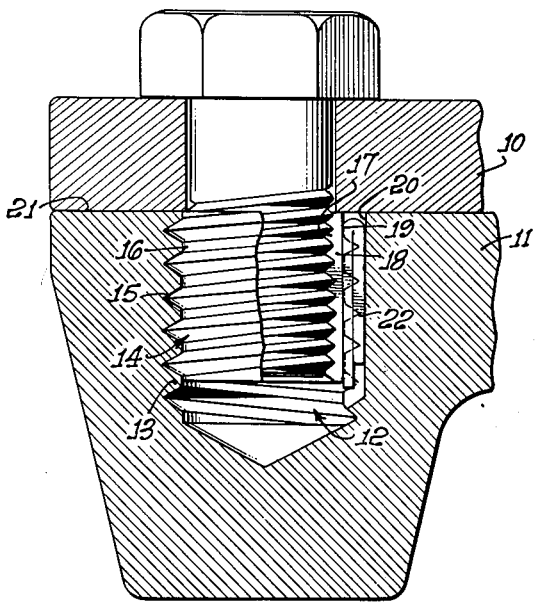
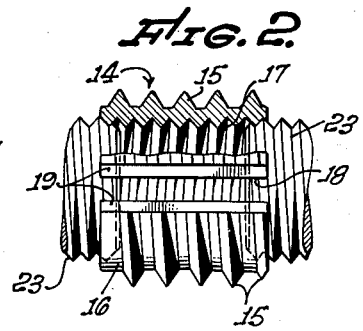
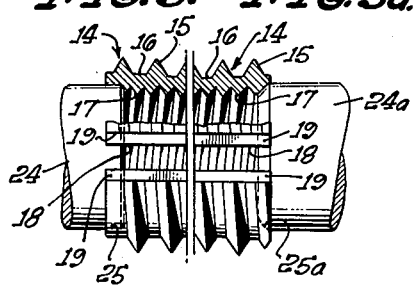
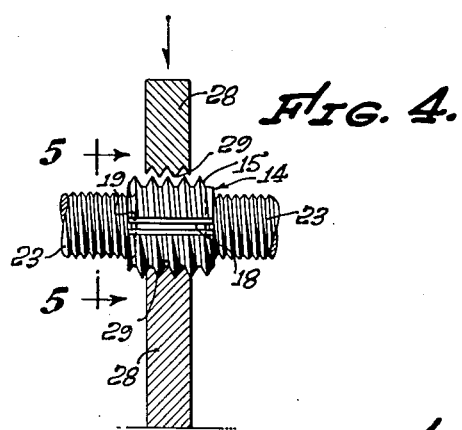
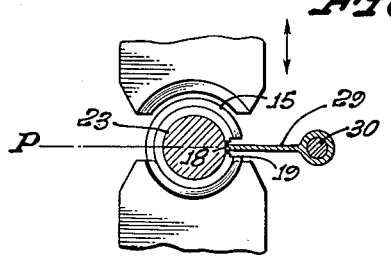
ROBERT NEUSCHOTZ,
INVENTOR.
BY *[signature]*
ATTORNEY

United States Patent Office 2,791,787
Patented May 14, 1957

2,791,787

METHOD OF FORMING TUBULAR LOCKING INSERTS

Robert Neuschotz, Los Angeles, Calif.

Application October 19, 1953, Serial No. 386,869

6 Claims. (Cl. 10—86)

This invention has to do with the formation of tubular form nut inserts of the type useable as replaceable nut sections of fasteners suitable for various purposes, typically in aircraft parts, the fastener components consisting essentially of a bolt and the sleeve nut which may be contained directly within the work material or metal, or within a preformed receptacle imbedded as by casting within the work metal, or within a nut part as shown in relation to other subject matter in my copending application Serial No. 345,187, filed March 27, 1953, on "Lock Nut Construction," now U. S. Patent No. 2,742,938, issued April 24, 1956. Replaceability of the nut part is desirable because of possible damage to the nut threads, and hence the practicability of being able to replace the nut proper instead of having to replace the work part or attempt to restore its threads.

Generally speaking, the present nut in its preferred form comprises a relatively thin walled sleeve which when inserted in the work metal or receptacle is held against turning by a key received within registering ways in the work bore wall and nut sleeve, the way section in the latter desirably being formed as a continuous or straight through split in one side of the sleeve. The nut may be characterized further and functionally as having locking characteristics in its capacity for retaining the bolt threaded therein, against accidental loosening. As more fully developed in my copending application Serial No. 386,868, entitled "Sleeve Type Locking Insert," filed on even date herewith, the nut is given its bolt locking capacity by reason of longitudinal taper from both ends toward and preferably to the center of the nut sleeve, the internal end diameter of the sleeve being sufficiently large to permit free turning entry of the bolt, and the taper then progessing at an angularity such as to cause progressive frictional engagement and binding of the bolt within the sleeve and to a magnitude holding the bolt against turning out accidentally. The sleeve nut is thus given in longitudinal section a slightly arched configuration symmetrically from the ends to the longitudinal center of the sleeve, so that the nut may be inserted and used to the same advantage either end first into the work or receptacle bore.

The present invention is directed particularly to a method for swaging and imparting to the sleeve the described angular or tapered form. In general the invention contemplates effecting the proper swaged deformation of an initially straight externally and internally threaded sleeve, by applying externally the swaging forces or pressures at or along the centrally intermediate extent of the sleeve while internally supporting the latter at its ends to maintain circular end form required for free reception and initial turning of the bolt into the sleeve.

In its more particular aspects, the invention contemplates swaging the sleeve in this manner, in predetermined relation to the key way split at one side of the sleeve. As will appear, the invention provides retention of the sleeve against turning during the swaging operation by a stop or guide received within the sleeve split or way, and applying the swaging forces to the surfaces of the sleeve as at opposite sides of and in directions having their components generally normal to the radial plane of the split.

Further features and objects of the invention, as well as the more detailed aspects of a typical procedure and means for performing the sleeve swaging operation, will be more fully understood from the following description of the accompanying drawing in which:

Fig. 1 is a view showing the fastener assembly in made-up condition securing together a pair of work material sections;

Fig. 2 is a view showing the sleeve nut in axial cross-section;

Figs. 3 and 3a are similar views illustrating variational forms of the nut and internal end supports;

Fig. 4 is a view illustrating the application of the swaging jaws or dies to the exterior of the internally supported nut; and Fig. 5 is a cross-section on line 5—5 of Fig. 4.

Referring first to Fig. 1, the fastener assembly is shown to releasably interconnect a pair of work metal sections 10 and 11, the latter of which contains a bore 12 having threads 13 which may be of any suitable kind or form, typically essentially standard V-threads with flattened crests. The nut generally indicated at 14 has the form of a relatively thin wall sleeve made typically of steel and having external threads 15 corresponding to the bore threads 13. The sleeve shell 16 also has internal threads 17, typically of V form, which ordinarily are smaller and have lesser lead and pitch than the external threads 15. One side of the sleeve has a straight through split 18 forming a way shouldered at 19 and registerable with way 20 formed in the work metal 11 when the top end of the nut is brought flush with the work surface 21, to form together a way for reception of a removable key 22 which holds the nut against turning.

In the operation of swaging the sleeve to give it progressively reducing angularity or taper from both ends toward the center, I support the sleeve internally at its ends as by a pair of threaded holders 23 which may be screwed a turn or two into the ends of the nut when internally threaded throughout its length as shown in Fig. 2, or by means of an unthreaded support 24 inserted within and fitting counterbores 25 formed in the ends of the nut as shown in Fig. 3, or by tapered supports 24a inserted within countersinks 25a as in Fig. 3a. The swaging pressures are applied by a pair of jaws 28 having faces 29 carrying segmental threads corresponding to the external threads 15 on the sleeve. As will be understood without the necessity for specific illustration, either or both the jaws 28 may be moved relatively together and against the outer surface of the sleeve and at directly opposed locations at the longitudinal center of the sleeve.

As oriented in Figs. 4 and 5, the jaws 28 bear against the top and bottom surfaces of the sleeve being positioned horizontally between the supports 23, the key way split 18 being positioned horizontally at the side. This orientation of the sleeve is maintained in relation to the swaging jaws by a guide finger or blade 29 the position of which is fixed at 30, received within the key way split 18. The jaws 28 are brought together sufficiently to swage the sleeve toward its longitudinal center to the degree desired. Typically, assuming the sleeve to have an end means diameter of about 1.000 inch, a length of about 1 inch, the applied swaging forces may be sufficient to reduce the mean diameter at the longitudinal center of the sleeve and a vertical plane as viewed in Figs. 4 and 5, to about .990 inch. The swaging forces being applied at opposite sides of and in directions generally normal to the radial plane P of the split 18, the effect of the swaging is to deform the sleeve cross-sectionally at its center to a slightly elliptical shape having its long axis in the direction of the plane P, and to spring the inner thread ends adjacent the key way split outwardly from their initial true circular curvature, to an extent obviating any tendency for the thread ends to score the surface of the bolt.

I claim:

1. The method of forming a nut insert from a sleeve, that comprises externally and internally threading the sleeve, splitting the sleeve substantially longitudinally through one side, internally supporting the opposite ends of the sleeve against deformation from circular form by inserting sleeve engaging supports within said ends, and swaging the sleeve progressively radially inward from the ends toward the center of the sleeve by applying pressure at least substantially normal to the radial plane of the split to so deform the sleeve that a bolt permitted relatively free turning entry into either end of the sleeve encounters increasing resistance to continued turning entry into the sleeve.

2. The method of forming a nut insert from a sleeve, that comprises externally and internally threading the sleeve, splitting the sleeve substantially longitudinally through one side, internally supporting the opposite ends of the sleeve against deformation from circular form by inserting sleeve engaging supports within said ends, and swaging the sleeve progressively radially inward from the ends toward the center of the sleeve by applying pressure predominately to opposite sides of the sleeve at a selected diameter and in a direction at least substantially normal to the radial plane of the split to so deform the sleeve that a bolt permitted relatively free turning entry into either end of the sleeve encounters increasing resistance to continued turning entry into the sleeve.

3. The method of forming a nut insert from a sleeve, that comprises externally and internally threading the sleeve, splitting the entire sleeve longitudinally through one side, internally supporting the opposite ends of the sleeve against deformation from circular form by inserting sleeve engaging supports within said ends, and swaging the sleeve progressively radially inward from the ends toward the center of the sleeve by applying pressure at least substantially normal to the radial plane of the split to so deform the sleeve into intermedial non-circular cross-sectional form such that a bolt permitted relatively free turning entry into either end of the sleeve encounters increasing resistance to continued turning entry into the sleeve.

4. The method of forming a nut insert from a sleeve, that comprises externally and internally threading the sleeve, splitting the entire sleeve longitudinally through one side, internally supporting the opposite ends of the sleeve against deformation from circular form by inserting sleeve engaging supports within said ends, and swaging the sleeve progressively radially inward from the ends toward the center of the sleeve by applying pressure predominately to opposite sides of the sleeve and in a direction normal to the radial plane of said split to so deform the sleeve that a bolt permitted relatively free turning entry into either end of the sleeve encounters increasing resistance to continued turning entry into the sleeve.

5. The method of forming a nut insert from a metallic sleeve, that comprises externally and internally threading the sleeve, splitting the sleeve longitudinally straight through one side, internally supporting the ends of the sleeve against deformation from circular form, and applying pressure to the threaded exterior of the sleeve at least substantially normal to the radial plane of the split to swage the sleeve progressively radially inward from the ends toward the center of the sleeve to so deform the sleeve that a bolt permitted relatively free turning entry into either end of the sleeve encounters increasing resistance to continued turning entry into the sleeve.

6. The method of forming a nut insert from a metallic sleeve, that comprises externally and internally threading the sleeve, splitting the sleeve longitudinally straight through one side, internally supporting the ends of the sleeve against deformation from circular form, and applying pressure to the threaded exterior of the sleeve to swage the sleeve progressively radially inward from the ends toward the center of the sleeve by applying pressure predominately to opposite sides of the sleeve and in a direction normal to the radial plane of said split to so deform the sleeve that a bolt permitted relatively free turning entry into either end of the sleeve encounters increasing resistance to continued turning entry into the sleeve.

References Cited in the file of this patent

UNITED STATES PATENTS

| | | |
|---|---|---|
| 702,254 | Stockman | June 10, 1902 |
| 1,683,114 | Williamson | Sept. 4, 1928 |
| 2,090,337 | Stoll | Aug. 17, 1937 |
| 2,286,982 | Todd | June 16, 1942 |
| 2,428,676 | Moore | Oct. 7, 1947 |
| 2,568,162 | Mohns | Sept. 18, 1951 |

FOREIGN PATENTS

| | | |
|---|---|---|
| 468,110 | Germany | Nov. 20, 1927 |